June 17, 1930.    W. H. THOMPSON    1,765,315
FREEZING MECHANISM
Filed March 2, 1929    2 Sheets-Sheet 1
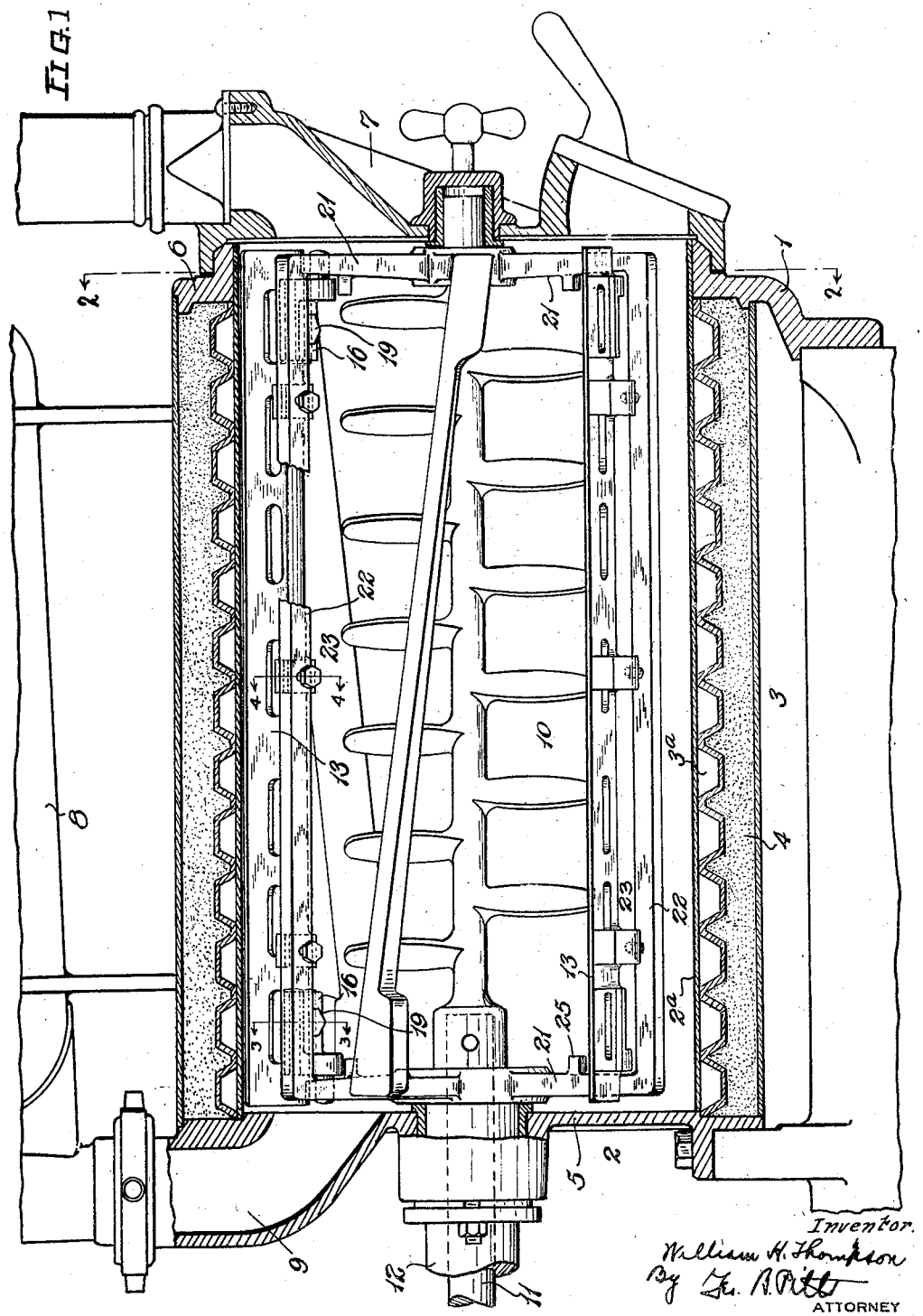

June 17, 1930.  W. H. THOMPSON  1,765,315
FREEZING MECHANISM
Filed March 2, 1929  2 Sheets-Sheet 2
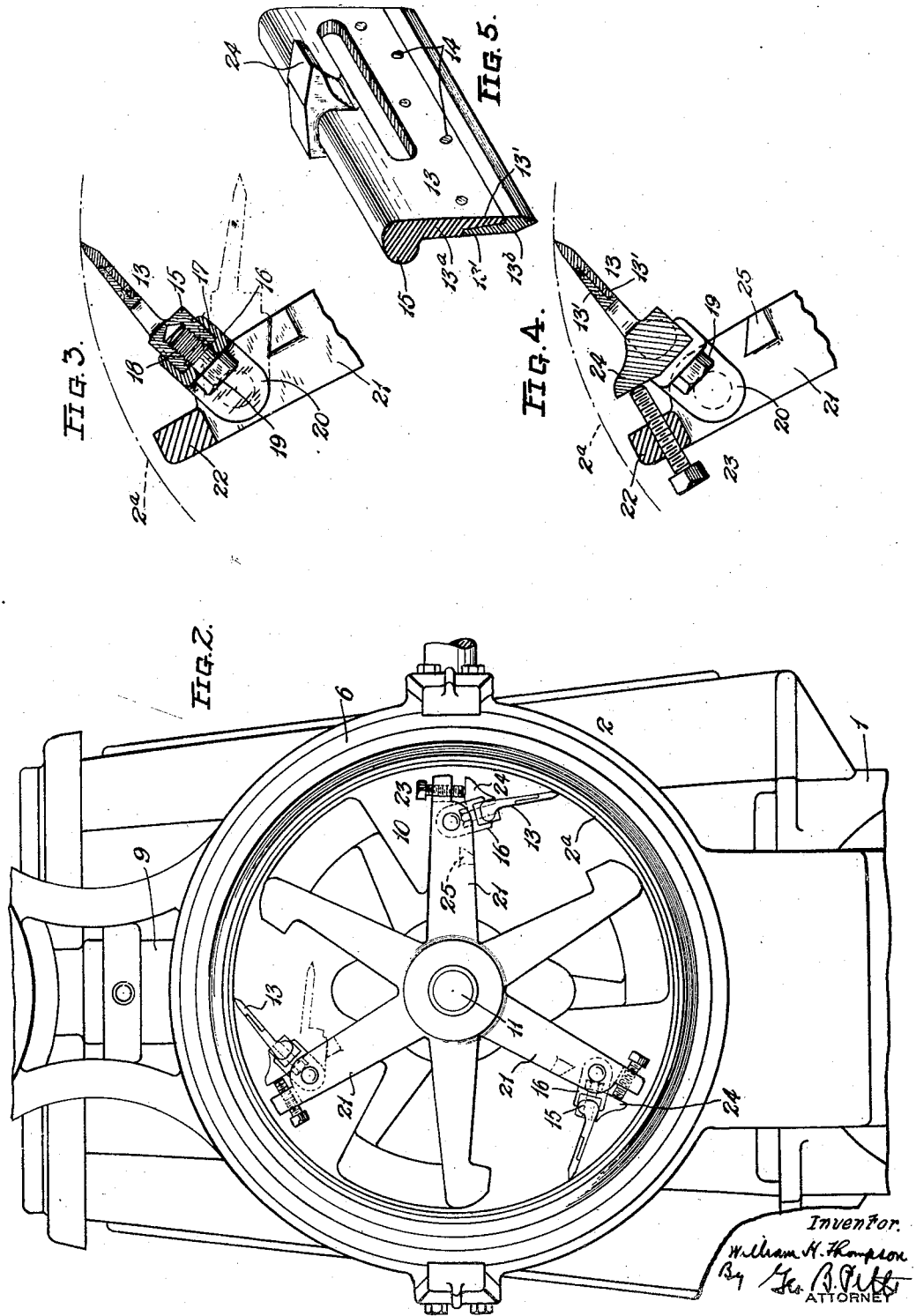

Patented June 17, 1930

1,765,315

UNITED STATES PATENT OFFICE

WILLIAM H. THOMPSON, OF CANTON, OHIO, ASSIGNOR TO THE H. H. MILLER INDUSTRIES COMPANY, OF CANTON, OHIO, A CORPORATION OF OHIO

FREEZING MECHANISM

Application filed March 2, 1929. Serial No. 343,896.

This invention relates to a freezing mechanism for making ice cream, water ices and the like.

In apparatus of this character a heat transfer medium is caused to circulate around or contact with the outer wall of the freezing cylinder, such medium usually consisting of a refrigerated brine. The effect of this medium is to cause adhesion of the material on the inner wall of the cylinder, which is quickly scraped off by one or more scraping blades which, in all prior mechanism of which I have knowledge, are revolved within the cylinder with their outer edges in engagement with the cylinder. As the scraping blades revolve at relatively great speed, the resulting centrifugal action forces them outwardly against the cylinder wall with considerable pressure. This engagement wears away the scraping edges of the blades and reduces their efficiency and in addition thereto the particles of worn-off metal become mixed in the frozen products, which makes it objectionable to eat.

One object of my invention is to provide a mechanism in which the scraping blade is so mounted, that its scraping edge is in close relation to the cylinder wall to effect the required scraping action, but is out of contact therewith as the blade revolves so that the wearing away of the metal and particles thereof mixing with the material or product is eliminated.

Another object of the invention is to provide an improved mounting for a scraping blade, whereby it may be adjusted in operative relation to the cylinder wall.

Another object of the invention is to provide sectional scraping blades whereby the portion which effects scraping may readily and economically be replaced.

Other objects of the invention will be apparent to those skilled in the art to which my invention relates from the following description taken in connection with the accompanying drawings, wherein Fig. 1 is a fragmentary sectional view of a freezing mechanism embodying my invention.

Fig. 2 is a section on the line 2—2 of Fig. 1.

Figs. 3 and 4 are sectional views on the lines 3—3 and 4—4, respectively, of Fig. 1.

Fig. 5 is a fragmentary perspective view showing certain details of construction.

In the drawings, 1 indicates a suitable support. 2 indicates a receptacle mounted on the support. The receptacle 2 is shown mounted in a horizontal position, which is the preferred arrangement, but my invention is equally applicable in or to a receptacle otherwise arranged, as for example, in upright position. The receptacle 2 comprises an inner cylinder $2^a$ and a jacket 3 forming a circuitous passage $3^a$ for the circulation of the heat transfer medium and a suitable insulation 4. 5 indicates a head suitably secured to one end of the cylinder $2^a$ to close the same and 6 indicates a ring secured to the opposite end of the cylinder $2^a$ and having a seat to which is removably secured a head 7. The head 7 is preferably similar in construction to the head shown in Letters Patent 1,449,623 granted to Leroy S. Pfouts. 8 indicates a batch tank mounted above the receptacle 2 and adapted to supply the material to be frozen to the cylinder $2^a$ through a valved conduit 9.

10 indicates the agitating mechanism within the cylinder and preferably comprising oppositely rotatable members connected respectively to the shafts 11, 12, which are suitably driven by a power mechanism (not shown); the shafts 11, 12, extending through the head 5 and the free end of the shaft 11 preferably having bearing in the head 7. Except as to the mounting of the scraper blades 13 and their construction, the agitating mechanism may be similar to that shown in Letters Patent No. 945,570 granted to John C. Miller.

Each blade 13 preferably comprises a main or inner section $13^a$ and an outer or scraping section $13^b$ and their opposite faces are cut-away, to form complementary portions 13′, whereby they are interlocked and have overlapping relation; such portions being detachably connected together by countersunk screws 14. The inner edge of the main section $13^a$ is thickened, as shown at 15, to provide a reinforcement. 16 indicates a fitting at each end of the blade, the fitting being formed with a pocket 17 to receive the enlarged portion of the main section 13ª. The enlarged portion is formed with a threaded opening 18 into which fits a suitable bolt 19 to removably, but rigidly, secure the blade to the fitting 16. At its outer end the fitting 16 is provided with a lug 20 which is suitably pivoted to the inner face of one of the arms 21 of the adjacent spider forming part of the outer, rotatable agitating member; the opposite end of the blade being similarly mounted on an aligned arm 21 of the other spider. As shown, I provide a plurality of scraping blades uniformly spaced around the axis of the cylinder, each mounted on aligned spider arms as above described. Each pair of aligned spider arms 21 is connected by a bar 22. The bar 22 forms a support for the adjusting device or devices 23, which in the present illustrated form of construction consist of a plurality of screws spaced along said bar and adapted to engage the adjacent blade 13 and hold it in a predetermined relation to the cylinder wall so that its scraping edge will function to effect scraping of the material therefrom without making actual contact with such wall. The adjusting means is so arranged that it does not prevent the blades from swinging inwardly, that is, away from the cylinder wall (see dotted lines in Fig. 3), as such swinging is desirable to facilitate the removal of the agitating mechanism from the cylinder 2 and its replacement therein. Each screw 23 is threaded into an opening formed in the bar 22 and its inner or free end engages with the rearward side of the blade 13, or an abutment 24 secured thereto and thus limits the outward swinging of the blade 13. I provide a plurality of adjusting devices along each bar 22 in uniform spaced relation. By preference, the screws and abutments are so arranged that the thrust on the screws is substantially endwise thereof. It is desirable to have the blades as close as possible to the cylinder wall, so as to scrape therefrom the material which adheres to the wall. By providing screws 23 between each blade and the adjacent connecting bar 22, a micrometer adjustment can be made to limit the outward swinging of the blade and hence insure a predetermined relation between it and cylinder wall while the freezing operation is carried on with a minute space between the scraping edge and the cylinder wall. Provision is therefore made to prevent rubbing or sliding engagement of the blades with the cylinder wall, so that the metal of the scraping blades will not be worn away and danger of metal particles accumulating and becoming mixed with the material is eliminated. By making the blades in sections, the outer section may be replaced at relatively small cost. By removing the screws or bolts 19, the blades 13 may be detached and replaced without affecting the adjustment of the screws 23.

The screws 23 may be provided with locking nuts or other suitable locking means. The blades 13 are preferably limited in their inwardly swinging movements by stops 25. By making the blades in sections, the outer section may be made from material that admits of ready sharpening.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In a freezing mechanism, the combination of a freezing chamber having an inlet and a valved discharge port, an agitating mechanism in said chamber including a movable scraping member extending substantially from end to end of said chamber, and means carried by said agitating mechanism for holding said member in a predetermined spaced relation to the wall of said chamber during operation of said mechanism to effect scraping of material from the chamber wall.

2. In a freezing mechanism, the combination of a freezing chamber having an inlet and a valved discharge port, an agitating mechanism in said chamber including a swingable scraping member extending substantially from end to end of said chamber, and adjustable means carried by said agitating mechanism for holding said member in a predetermined spaced relation to the wall of said chamber during operation of said mechanism to effect scraping of material from the chamber wall.

3. In a freezing mechanism, the combination of a freezing chamber having an inlet and a valved discharge port, an agitating mechanism in said chamber including a bar extending substantially from end to end of said chamber and a scraping member swingably mounted on said mechanism in parallel relation to said bar, and means carried by said bar for holding said member in a predetermined spaced relation to the wall of said chamber during operation of said mechanism to effect scraping of material from the chamber wall, said holding means comprising a threaded member forming an adjustable stop to limit the outward swinging of the member.

4. In a freezing mechanism, the combination of a freezing chamber having an inlet and a valved discharge port, an agitating mechanism in said chamber including a pair of spiders, bars connecting the aligned arms of the spiders and scraping blades each pivotally mounted on one pair of aligned spider arms, and means carried by each bar for limiting the outward swinging movement of the adjacent blade under the influence of centrifugal force to maintain it in a predetermined spaced relation to the wall of said chamber during operation of said mechanism to effect scraping of said chamber wall.

5. In a freezing mechanism, the combination of a freezing chamber having an inlet and a valved discharge port, an agitating mechanism removably mounted in said chamber including a pair of spiders, bars connecting the aligned arms of the spiders and scraping blades each pivotally mounted on one pair of aligned spider arms, and means carried by each bar for limiting the outward swinging movement of the adjacent blade under the influence of centrifugal force to maintain it in a predetermined spaced relation to the wall of said chamber during operation of said mechanism to effect scraping of said chamber wall, each said holding means comprising a member adjustably mounted on said bar and engaging the adjacent blade to limit its outward movement, but permitting inward swinging of said blade when said agitating mechanism is removed from or replaced in said chamber.

6. In a freezing mechanism, the combination of a freezing chamber having an inlet and a valved discharge port, an agitating mechanism in said chamber including a scraping member comprising longitudinally extending inner and outer sections having interlocked overlapping portions detachably connected together, the inner section being pivotally supported on a portion of said mechanism and the outer member serving to scrape material adhering to the wall of said chamber.

In testimony whereof I have hereunto subscribed my name.

WILLIAM H. THOMPSON.